UNITED STATES PATENT OFFICE.

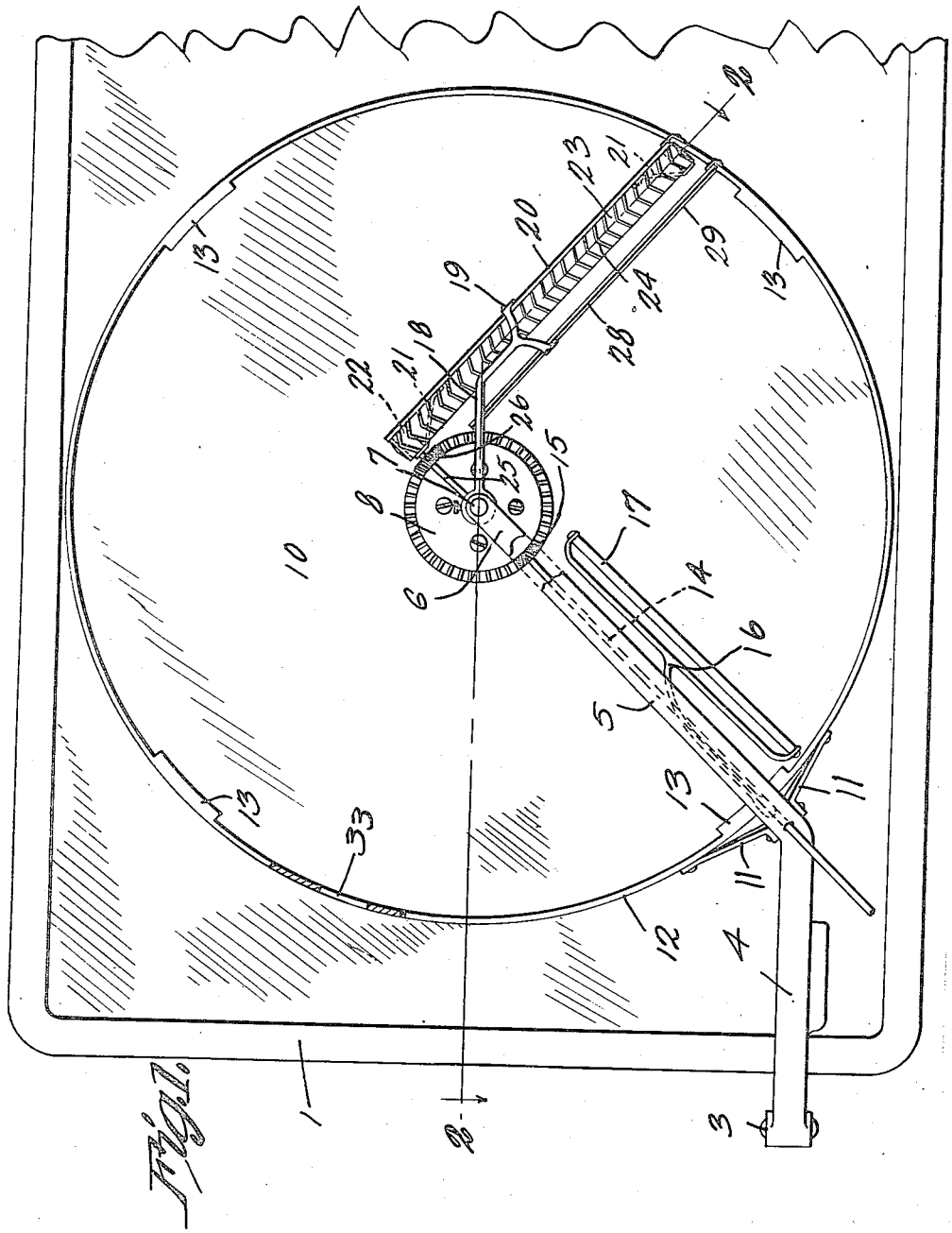

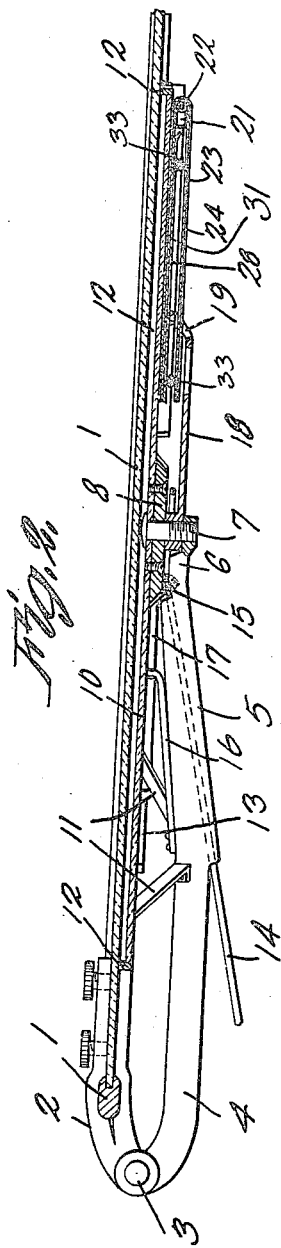

JOHN BAUER, OF LOUISVILLE, KENTUCKY.

WIND-SHIELD ATTACHMENT.

1,225,746. Specification of Letters Patent. Patented May 15, 1917.

Application filed January 12, 1917. Serial No. 142,033.

*To all whom it may concern:*

Be it known that I, JOHN BAUER, a citizen of the United States, residing at Louisville, in the county of Jefferson and State of Kentucky, have invented a new and useful Wind-Shield Attachment, of which the following is a specification.

This invention relates to an attachment for wind shields such as used on automobiles, although the invention is also capable of being used in connection with the front of a street car.

One of the objects of the invention is to provide means whereby an unobstructed view through the wind shield or glass front of a vehicle may be maintained under all conditions of weather, novel mechanical means being employed for keeping the transparent surface in front of the driver clear.

A still further object is to provide means for brushing the transparent surface and additional means for continuously rotating said surface whereby any accumulations of moisture, snow or the like thereon will be removed therefrom.

Another object is to provide an attachment of this character which can be quickly moved into or out of position of use, which is simple and compact in construction and will not readily get out of order.

With the foregoing and other objects in view which will appear as the description proceeds, the invention resides in the combination and arrangement of parts and in the details of construction hereinafter described and claimed, it being understood that changes in the precise embodiment of the invention herein disclosed, can be made within the scope of what is claimed, without departing from the spirit of the invention.

In the accompanying drawings the preferred form of the invention has been shown.

In said drawings:—

Figure 1 is a front elevation of a portion of a wind shield having the present improvements combined therewith.

Fig. 2 is a section on line 2—2 Fig. 1.

Fig. 3 is a front elevation of the belt carrying member.

Fig. 4 is a front elevation of a slightly modified form of wind shield with which the attachment may be used.

Fig. 5 is an enlarged longitudinal section through the belt and showing its yielding backing strip.

Referring to the figures by characters of reference 1 designates an ordinary wind shield such as used in connection with motor vehicles. The attachment constituting the present invention is adapted to be attached to the frame of this wind shield and normally to be supported in front of a portion of the transparent surface of the wind shield. A clamp 2 is secured in any suitable manner to the frame of the wind shield and pivotally connected to this clamp as indicated at 3 is an arm 4 having an upwardly inclined end portion 5 and which inclined portion is preferably tubular as shown and provided with a terminal housing 6. Extending from this housing is a bearing stud 7 on which a gear 8 is mounted for rotation, this gear being fastened in any suitable manner to the center of a disk 10 of glass or any other suitable transparent material.

Arms 11 are extended from the arm 4 and are fastened to a ring 12 of metal or the like and this ring is provided at opposed edges with guide ears 13. These ears lap the opposed faces respectively of the disk 10 and said disk is mounted to rotate freely within the ring when the gear 8 is rotated.

A shaft 14 is journaled within the tubular portion 5 of the arm and this shaft is adapted to be coupled in any suitable manner to one of the wheels of the vehicle or to the motor or to any other driving means whereby when the vehicle is in motion, the shaft 14 will be rotated continuously. This shaft 14 has a bevel gear 15 constantly meshing with the gear 8 so that, as the shaft 14 is revolved, disk 10 will be rotated within the ring 12.

For the purpose of holding the disk against vibration while being rotated, an arm 16 is extended from the arm 4 and has an elongated roller 17 journaled therein at its ends, this roller being covered with rubber or the like and bearing throughout its length upon the disk 10, said roller being disposed substantially radially along the disk.

An arm 18 is fixedly connected to the housing 6 and has a forked extension 19. One arm of this extension is attached to an elongated strip 20 having terminal brackets 21. Journaled between the strip 20 and its brackets are rollers 22 and mounted on the rollers is an endless belt 23 preferably formed of rubber and provided in its outer or active face with transverse ribs 24. One of the rollers 22 is secured to a shaft 25 which is journaled in the arm 18 and has a gear 26 receiving motion from the gear 8.

The other arm of the forked portion 19 is attached to an elongated strip 28 having a squeegee 29 extending longitudinally thereof and engaging the surface of the disk 10.

The gear 15 is arranged within the housing 6 so as to be protected from snow, rain and the like and, if preferred, the housing may be extended so as to inclose the gears 8 and 26, although this is not deemed essential.

As before pointed out, shaft 14 is to be coupled to one of the wheels of the vehicle, to a flexible shaft or the like, or can be coupled to the motor. When the machine is moved forward the shaft 14 is rotated and motion is transmitted therefrom through the gears 15 and 8 to the disk 10. The disk is thus caused to rotate and the surface thereof will be moved transversely of the active flight of the belt 23 and of the squeegee 29. The belt is continuously actuated by the shaft 25 which receives its motion through gears 26 and 8 and therefore the belt 23 will be caused to brush the disk 10 and convey accumulations of snow and the like outwardly toward the periphery of the disk. Any of the accumulated material which is not thus removed will be held back by the squeegee 29 so that that portion of the disk 10 which has passed the cleaning apparatus will be left clear and the view of the operator will be unobstructed.

When the apparatus is not in use it can be easily swung laterally away from position in front of the wind shield or can be completely detached therefrom.

If desired, the wind shield can be formed with a circular opening 30 in the transparent portion thereof as indicated in Fig. 4 so that when the attachment is in active position the ring 12 will occupy a position within this opening.

For the purpose of holding the active flight of the belt 23 against the glass disk, a backing strip 31 is preferably mounted so as to extend along said flight and hold it against the glass. This strip is preferably mounted on springs 32 as shown in Fig. 5, or in any other manner desired. These springs may be mounted on ears 33 extending from the strip 20.

The ring 12 may be provided with ventilating openings 33', one of which has been indicated in Fig. 1.

What is claimed is:—

1. An attachment for wind shields and the like including a revoluble transparent disk, an endless belt extending from the periphery of the disk to a point adjacent the center thereof and engaging one surface of the disk, means for continuously actuating said belt during the rotation of the disk to rub one surface of the disk.

2. An attachment for wind shields and the like, including a supporting structure, a transparent disk mounted for rotation therein, an endless belt engaging one surface of the disk and extending toward the periphery thereof, means for supporting said belt in front of the disk, a shaft, means for transmitting motion from the shaft to the disk, means for transmitting motion from the shaft to the belt.

3. An attachment for wind shields and the like, including a supporting structure, a transparent disk mounted for rotation therein, an endless belt engaging one surface of the disk and extending toward the periphery thereof, means for supporting said belt in front of the disk, a shaft, means for transmitting motion from the shaft to the disk, means for transmitting motion from the shaft to the belt, and an elongated roller engaging the disk and extending from the periphery thereof to a point adjacent its center.

4. An attachment for wind shields and the like, including a supporting structure, a transparent disk mounted for rotation therein, an endless belt engaging one surface of the disk and extending toward the periphery thereof, means for supporting said belt in front of the disk, a shaft, means for transmitting motion from the shaft to the disk, means for transmitting motion from the shaft to the belt, and means engaging the disk for holding the same against vibration.

5. An attachment for wind shields and the like, including a circular frame, means for supporting the same, a transparent disk mounted for rotation within and guided by the frame, a shaft, means actuated thereby for rotating the disk, an endless belt engag- 11 ing the front face of the disk, and means operated by the shaft for actuating the belt relative to the disk during the rotation of the disk.

6. An attachment for wind shields and the 1: like, including a circular frame, means for supporting the same, a transparent disk mounted for rotation within and guided by the frame, a shaft, means actuated thereby for rotating the disk, an endless belt engag- 1: ing a face of the disk, means operated by the shaft for actuating the belt, anti-friction means engaging the disk to hold it against vibration, and a squeegee engaging the disk and adjacent the belt. 1

7. The combination with a structure mounted to swing relative to a wind shield having an opening, of a ring carried by the structure and adapted to move into and out of the opening, a transparent disk mounted 1 for rotation within the ring, means for rotating the disk, and means engaging the disk for removing accumulations of material therefrom during the rotation of the disk.

8. The combination with a structure mounted to swing relative to a wind shield having an opening, of a ring carried by the structure and adapted to move into and out of said opening, a transparent disk mounted for rotation within the ring, a shaft, means operated by the shaft for rotating the disk within the ring, an endless belt engaging the disk, means operated by the shaft for actuating the belt during the rotation of the disk, and a squeegee engaging the disk and adjacent the belt.

9. An attachment for wind shields and the like, including a circular frame having ventilating openings therein, means for supporting the same, a transparent disk mounted for rotation within and guided by the frame, a shaft, means actuated thereby for rotating the disk, an endless belt, means operated by the rotation of the disk for driving the belt, and a yieldingly supported backing strip engaging the belt to press it against the disk.

In testimony that I claim the foregoing as my own, I have hereto affixed my signature in the presence of two witnesses.

JOHN BAUER.

Witnesses:
W. R. SHACKLETTE,
WM. BAUER.